(12) United States Patent
Macklin

(10) Patent No.: US 6,859,526 B2
(45) Date of Patent: Feb. 22, 2005

(54) SYSTEM AND PROGRAM PRODUCT FOR MANAGING CALL INFORMATION

(75) Inventor: Lee Edward Macklin, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 09/898,353

(22) Filed: Jul. 3, 2001

(65) Prior Publication Data

US 2003/0007613 A1 Jan. 9, 2003

(51) Int. Cl.[7] .................................................. H04M 1/64
(52) U.S. Cl. ................................. 379/88.19; 379/88.11; 348/14.06
(58) Field of Search ............................. 379/67.1, 88.11, 379/88.12, 88.19, 88.2, 88.21, 88.22, 93.17, 142.01; 348/14.06

(56) References Cited

U.S. PATENT DOCUMENTS

| | | | | |
|---|---|---|---|---|
| 5,283,818 A | * | 2/1994 | Klausner et al. ......... 379/88.25 |
| 5,345,258 A | * | 9/1994 | Matsubara et al. |
| 5,390,236 A | * | 2/1995 | Klausner et al. ......... 379/88.11 |
| 5,594,784 A | * | 1/1997 | Velius ..................... 379/88.02 |
| 5,742,736 A | * | 4/1998 | Haddock .................... 704/270 |
| 5,907,604 A | * | 5/1999 | Hsu |
| 6,295,391 B1 | * | 9/2001 | Rudd et al. ................. 382/313 |
| 6,333,973 B1 | * | 12/2001 | Smith et al. ............. 379/88.12 |
| 6,389,124 B1 | * | 5/2002 | Schnarel et al. ........ 379/142.01 |
| 6,535,594 B1 | * | 3/2003 | Reeves-Nobles et al. ......... 379/142.01 |
| 2002/0002502 A1 | * | 1/2002 | Gerszberg et al. |
| 2002/0085087 A1 | * | 7/2002 | Hong |

* cited by examiner

*Primary Examiner*—Scott L. Weaver

(57) ABSTRACT

A method for managing call information has steps of receiving a plurality of calls, determining the caller for each call, and recording a message for at least one of the calls with a recorder. A call record is created for each call, with the record having at least caller information and an indication of whether a recorded message is associated with the call. The records are displayed on a display, which has a selector for selecting one of the records. The method further comprises a step of replaying the recorded message associated with a selected record.

11 Claims, 4 Drawing Sheets

SYSTEM AND PROGRAM PRODUCT FOR MANAGING CALL INFORMATION

FIELD OF THE INVENTION

The present invention is related to systems and methods for recording, storing and managing voice messages. Other fields of the invention are caller identification systems, phone answering systems, voice message display screens, and voice message system user interfaces.

BACKGROUND OF THE INVENTION

Phone message systems have found widespread popularity and use. Generally, such systems provide a means for answering a phone call, with the caller able to leave a voice message for later retrieval and listening. Such systems are generally known, with a variety of mechanisms available for the recording of the message. By way of example, tape or other magnetic media may be used, in which case messages are recorded in succession as they occur. Some systems may "mark" or otherwise "flag" individual messages for organization purposes, so that upon playback a user may selectively navigate through the messages without having to listen to each message in succession.

In addition to phone message systems, caller identification systems are widespread. Generally, these systems allow a user to view on a display the identity of the originator of an incoming call. A history of incoming calls may be stored and viewed on the display, so that for instance a user can view the identities of incoming callers for the previous plurality of calls. In addition to the caller identity, a caller identification system may also store a time that the call was received. This may be of use, for instance, in viewing a history of incoming calls to determine when a particular call was received.

Caller identification and phone message systems as they are known have numerous problems associated with them. As an example, caller identification systems may not provide for messages. That is, caller identification systems as they are known may generally provide only a time of call made and an identity of the call originator. Phone message systems do of course provide messaging capabilities, but they lack caller identification features. Presumably the benefits of both systems could be enjoyed by employing both systems, but this would require purchase, installation, setup, and maintenance of two separate systems. Additionally, use of the two systems could be cumbersome in that no cross referencing of calls between the two systems would be provided.

By way of additional example, many phone messaging systems are disadvantageous in that a history of calls received is not available without listening to each message received. Additionally, phone message systems by and large only provide recorded audio information. No information regarding the identity of a caller is provided unless the caller has chosen to indicate in the recorded message identity information. While caller identification systems of course provide these capabilities, use of two separate systems is disadvantageous for the reasons discussed above. Also, systems may not provide the ability to listen to messages except in succession as recorded. By way of example, if seven messages have been recorded, it may be impossible to listen to the seventh message without listening to, or at least queuing past, the first six messages. This can result in unwanted delay and effort.

These and other problems remain unresolved in the art.

SUMMARY OF THE INVENTION

The present invention is directed to a system, method, and program product for managing communications information. An embodiment of a system of the invention generally comprises a recorder for recording a message from an incoming communication, a processor for identifying the origination data for an incoming communications, and a display for displaying a plurality of communications records, with each record comprising communications origination identity information and an indication of whether a recorded message exists for the communication. The system further comprises a selector for selecting one of the records from the display, with the message from the selected record then being replayed from the recorder. Displayed records can be selected regardless of sequence.

Preferably, the display of the system comprises a touch screen display and the selector comprises a detector for detecting which portion of the screen is being touched. A record displayed on that touched portion of the screen will thereby be selected. Also, the display preferably comprises a scroll control for scrolling through the records.

An embodiment of a method of the invention comprises the steps of receiving a plurality of incoming communications, determining communications origination identity data for each of the communications, recording a message for at least one of the communications, and displaying a communications record for a plurality of the communications on a display. The records displayed may comprise identity data and an indication of whether a recorded message is available for the communication. The method further comprises the step of responding to the selection of any of the records from the display by playing the recorded message associated with the record.

Preferably, the system and method of the invention are practiced with a telephone system wherein communications comprise telephone calls.

Those knowledgeable in the art will appreciate that the present invention lends itself well to practice in the form of a computer program product. Accordingly, additional embodiments of the present invention are computer program products comprising a computer usable medium having computer readable program code embodied in the medium that when executed causes a system to execute the steps of the method of the invention.

Those knowledgeable in the art will also realize that the present invention in any of its various embodiments solves many otherwise unresolved problems in the art. For example, embodiments of the system and method of the invention when practiced with telephone systems allow a user to determine how many calls have been missed, who the missed calls have been from, and whether a message has been recorded. Additionally, the user can select any of the missed calls having a message associated with it for message playback, regardless of the sequence of call reception.

The above brief description sets forth broadly some of the more important features and advantages of the present disclosure so that the detailed description that follows may be better understood, and so that the present contributions to the art may be better appreciated. There are, of course, additional features of the disclosure that will be described herein. In this respect, before explaining embodiments of the disclosure in detail, it is to be understood that the disclosure is not limited in its application to the details of the construction set forth in the following description or illustrated in the drawings. The present invention may provide additional embodiments, as will be appreciated by those knowledgeable in the art. Also, it is to be understood that the phraseology and terminology employed herein are for description and not limitation.

DETAILED DESCRIPTION

It will be appreciated that the present invention will be of utility when practiced in an embodiment that may comprise a method, a system, and/or a computer program product. Further, it will be appreciated that various embodiments of the method of the invention may be closely related to one another. For example, a computer program product embodiment may comprise program instructions for causing a system embodiment of the invention to carry out the steps of a method embodiment of the invention. For convenience, then, a method embodiment and a system embodiment of the invention will be discussed and described herein generally simultaneously.

Also, it will be appreciated that preferred embodiments of systems and methods of the invention are practiced with telephone systems wherein communications comprise telephone calls. It will be appreciated, however, that the present invention is not limited to practice with telephone systems, but may likewise be of utility when practiced with a wide variety of communications mediums. By way of example, other invention embodiments may be practiced with video based, text based, audio/video based, and the like communications media. In considering the preferred telephone call embodiments discussed and illustrated herein, then, it will be appreciated that various telephone related elements of the embodiments could easily be replaced with similar functional elements for practice of other communications media based embodiments. By way of example, a telephone communications device could easily be replaced by a communications device comprising an audio/video device.

Figure 1A:
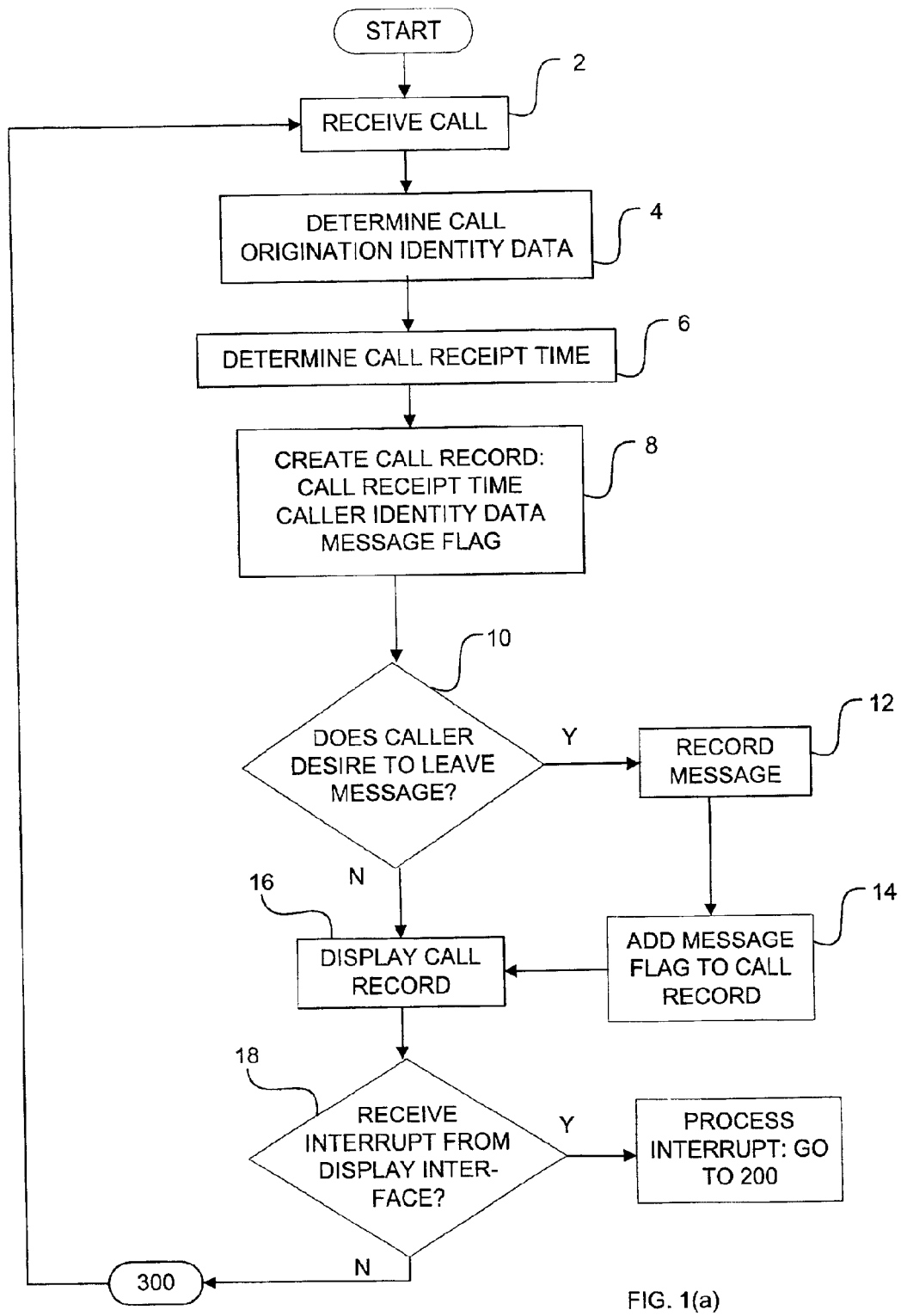
FIG. 1(a)–1(b) is a flowchart illustrating an embodiment of a method and a program product of the invention.
Figure 1B:
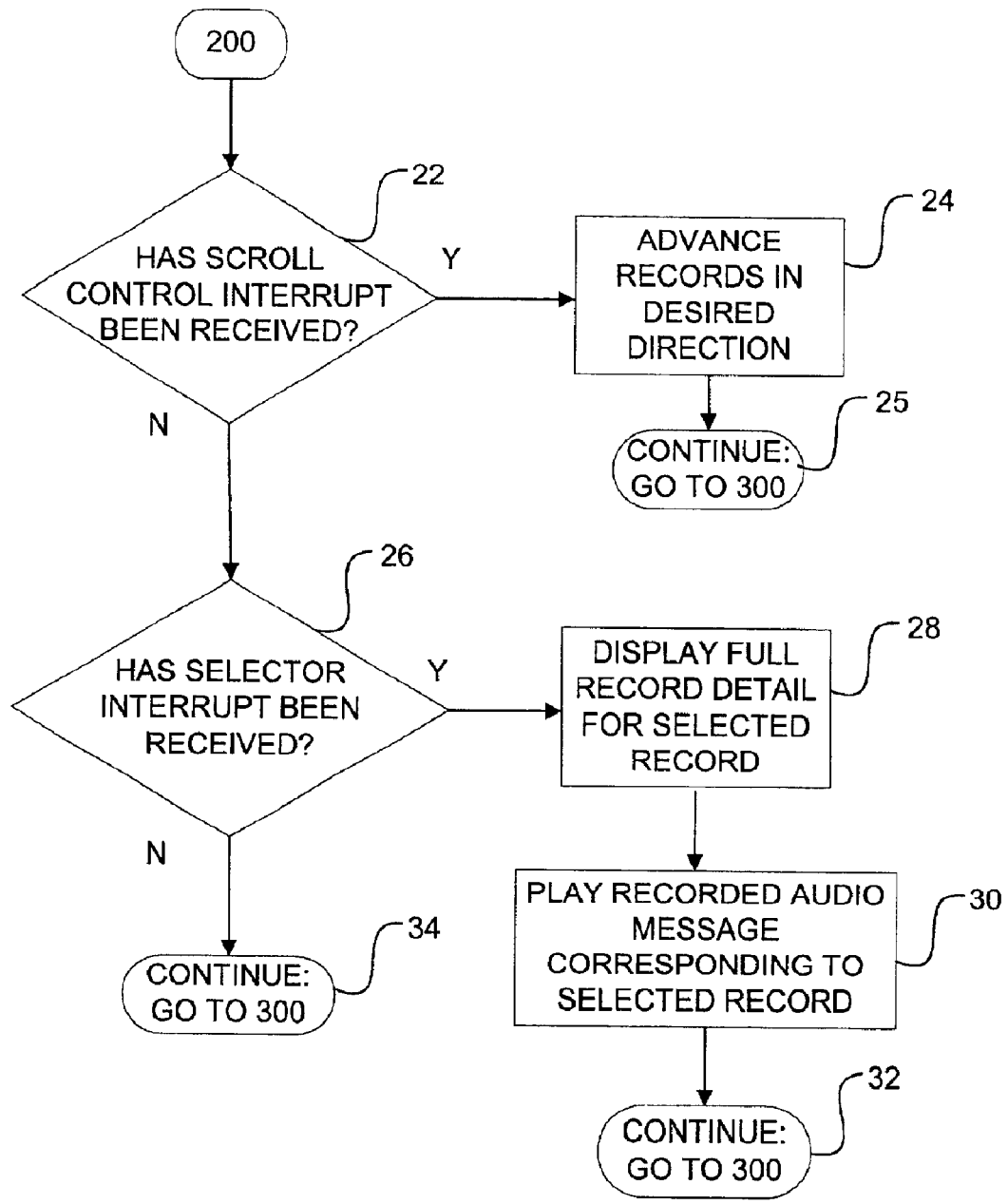
Figure 2:
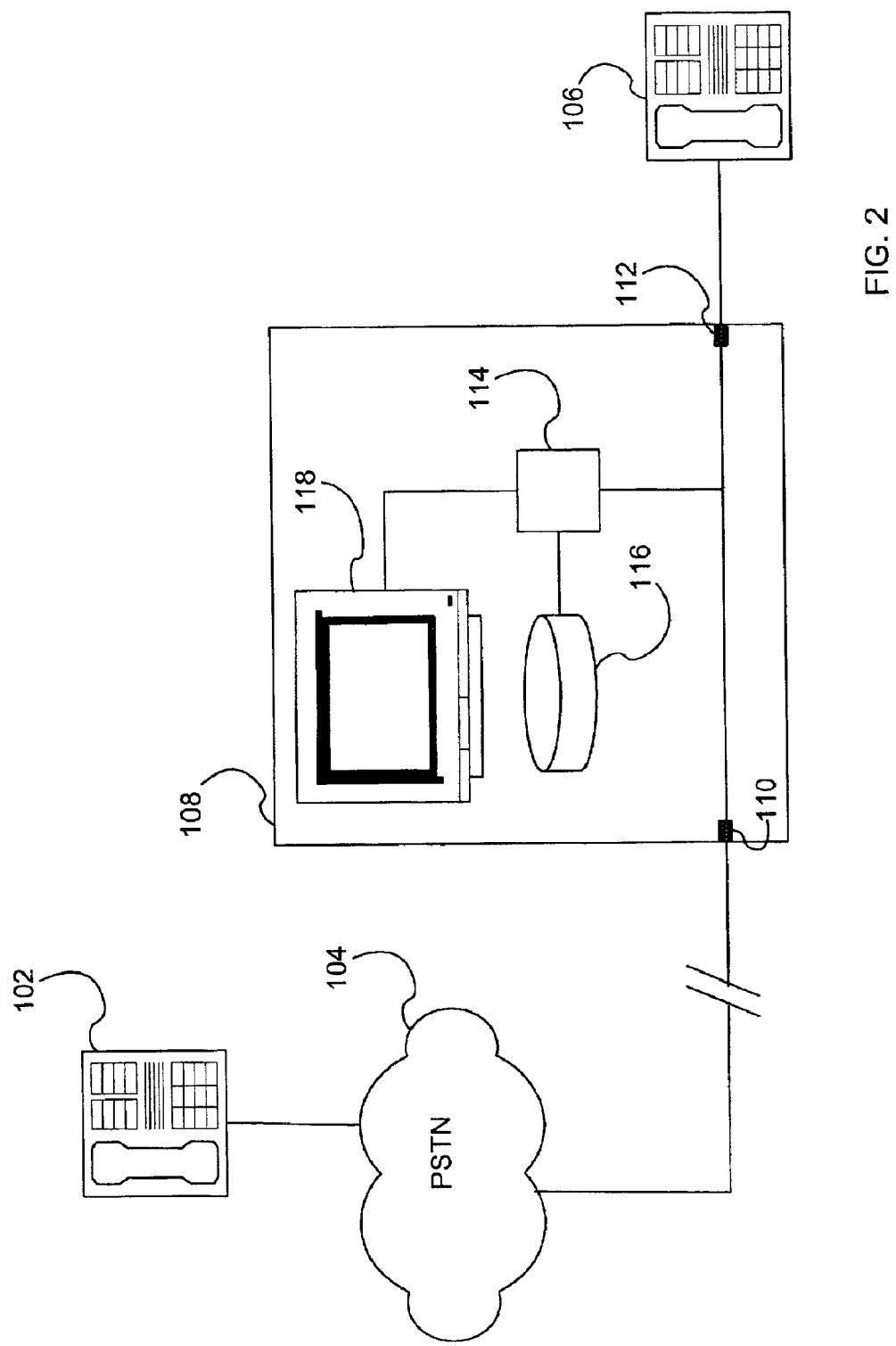
FIG. 2 is a schematic of an embodiment of a system of the invention.

Reference is thereby drawn to FIGS. 1 and 2. FIG. 1 is a flowchart illustrating steps of an embodiment of a method of the invention, while FIG. 2 is a schematic of a system of the invention. The method embodiment of FIG. 1(a) begins by receiving an incoming communications, which preferably comprises a telephone call. The incoming call may originate from a communications device such as phone 102 of FIG. 2 for delivery over a communications network such as the PSTN (public switched telephone network) 104 destined for a second communications device such as the phone 106. The system 108 of FIG. 2 comprises a first 110 and a second 112 communications port for connection to a communications line such as the PSTN 104 phone line and to the phone 102, respectively. In this manner the system 108 is operably connected to the phone line for receiving incoming calls.

Referring once again to FIG. 1(a), the method embodiment proceeds to determine the origination identity information for the incoming call (block 4) and to determine the time of call receipt (block 6). These steps are preferably accomplished using a processor 114. The term "processor" as used herein is intended to broadly refer to a device for executing instructions, with preferred examples comprising commercially available processors such as embedded circuitry chips, printed circuit cards, and the like.

As used herein, the term "origination identity data" is intended to broadly refer to data regarding the identity of the originator of a communication. By way of example, identity data may comprise the name of a person or identity; as well as a telephone number, post address, network address, psuedo-name, and the like for the originator. Steps for determining the origination identity data of an incoming communications are generally known in the art. Broadly, these steps may comprise receiving communications identification data coincident with reception of the communications and recognizing the identity data. The identity data may be provided in a particular format, with a code or identifier, or the like to signal that identity data is available. Further, security or other access mechanisms may exist that may need to be satisfied to access the data.

Referring to telephone communications by way of example, methods for determining origination data are well known. These systems and methods are generally referenced as "caller ID". The receiver of a call may have to subscribe to a particular carrier "caller ID" service to have access to the call identity data, which is generally provided by the local exchange carrier or switch. For more detailed information regarding methods and systems for determining caller identity information, reference is made to U.S. Pat. No. 4,582,956 issued to Doughty, and incorporated herein by reference.

The method embodiment of FIG. 1 then proceeds to create a call record (block 8), with the call record comprising a time of receipt of the call and caller identity data. Preferably, this method step is performed by the processor 114. The method embodiment continues to a step of determining whether the caller desires to leave a message (block 10). This step may be accomplished by the processor 114 issuing an audio prompt or the like. If a message is to be left, the method proceeds to record the message (block 12) with a recorder 116. As will be appreciated by those knowledgeable in the art, the recorder 116 may comprise any of a wide variety of components that are generally known in the art and commercially available. Examples comprise, but are not limited to, digital recorders, analog recorders, and the like. The recorder 116 may of course comprise a memory resource for storing recorded messages. Also, it is noted that the present invention is not limited to practice with audio messages. Other invention embodiments comprise recording of video, text, audio/video, and the like messages.

If a message has been left, the method of the invention proceeds to add an indicator to the call record that a message exists for that call (block 14). The term "indicator" as used herein is intended to broadly refer to data useful for marking the record. By way of example, an "indicator" as used herein may comprise a logical flag such as a character or character string.

Figure 3:
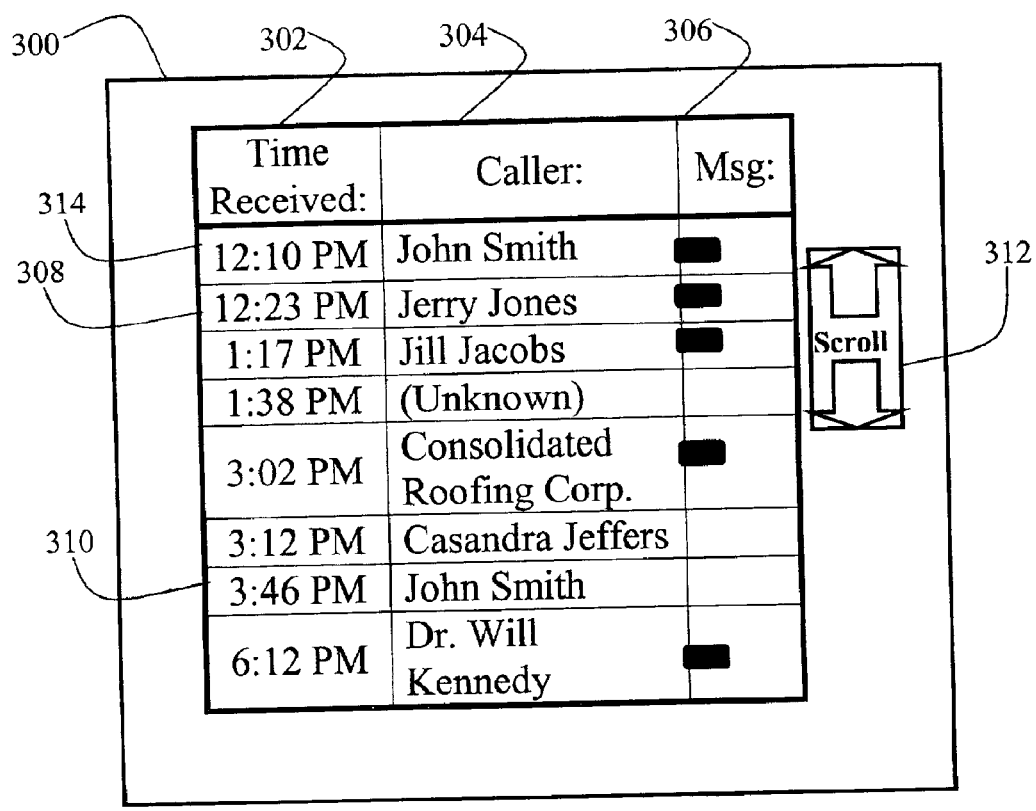
FIG. 3 illustrates a display useful in practice of an embodiment of the invention.

The method of the invention proceeds to display the call record (block 16) using a display 1 18. FIG. 3 illustrates an embodiment of a display 300 useful for practice with system and method embodiments of the invention. Preferably, each record is displayed as a row having a plurality of individual fields. The fields may be viewed as columns across the rows. A time received field 302 comprises a column for displaying the time that the subject phone call from each record was received. A caller identity field 304 comprises a column for displaying the caller identity data for each record, and a message indicator field 306 comprises a column for displaying the message indicator for each record.

By way of further example, a call record 308 is displayed as a row with time received data in the column 302 indicating that the call was received at 12:23 PM, caller identity data in the column 304 indicating that the call originated from Jerry Jones, and message indicator data of column 306 indicating that a recorded message is present on the recorder 116 for this call. In the example display of FIG. 3, message indicators comprise a black rectangle, with the lack of such an indicator in the message indicator column 306 suggesting that no recorded message is available for a particular record, as is illustrated for example in record 310.

Preferably, a plurality of records is displayed on the display 300. In the display 300 embodiment, eight records are being displayed. Preferably, the display further comprises a scroll control 312 for causing the display to show additional records. Accordingly, the display 300 may further comprise a memory or the like for storing records not currently displayed. A system of the invention also preferably comprises a selector for selecting one of the records. Preferably, the display 300 comprises a touch screen, and the selector comprises a detector for detecting which portion of the touch screen is being touched. A record displayed on that portion of the screen will then be selected.

As used herein the term "touch screen" is intended to broadly refer to a screen for displaying data that allows for interaction through physical contact with the screen. Those knowledgeable in the art will appreciate that touch screens are generally known in the art and are readily commercially available. Generally, these screens use electrical, sound, or light generating and detecting means to determine which portion of a screen is being touched. The screen may be organized into vertical and horizontal divisions such as X and Y coordinates. Data displayed on the screen can be associated with the X and Y coordinates of the touch screen. Touching of the screen may be accomplished using a finger, a stylus, a pen, or the like.

Other selectors may of course be comprised in the practice of the invention. By way of example, the scroll control 312 could comprise a selector function whereby the scroll control could be used to highlight any desired record with a select control available to choose a highlighted record. Additional examples may comprise use of voice recognition and activation tools, keyboard and/or mouse based controls, a keypad control from the phone 106 for scrolling and selecting records, or the like.

The method embodiment of FIG. 1 accommodates scrolling and selection of records through first recognizing an interrupt from the display (block 18). As used herein, the term "interrupt" is intended to refer to a signal generated as the result of an event. By way of example, manipulation of the scroll control may comprise an event that will generate an interrupt signal. If an interrupt is received, the method embodiment determines whether the interrupt is a scroll control (block 22). If so, records are advanced in the desired direction (e.g., either moving upwards or downwards) (block 24). After scrolling is completed, the method continues with receiving calls (block 25).

The interrupt may also be queried to determine if it is the result of a selection action (block 26), which may for instance comprise the touching of a particular portion of the screen. If the interrupt is a selection action, the selected record may have its full record displayed (block 28), and also may have a recorded audio message associated with the recorded message played back (block 30) from the recorder 116. The method step illustrated by block 28 may comprise for example displaying additional information not displayed in the fields of the standard display as illustrated in FIG. 3. Additional information may comprise by way of example and not limitation, a complete name, address, and phone number of the caller, a call duration time, and the like.

Importantly, both the method and system of the invention allow for selection of any displayed record by the display selector. That is, the selector may choose any record to have a corresponding recorded message played back regardless of the sequence of call reception or display of records. With reference to FIG. 3 by way of example, a user could select the record 308 for message playback without having to playback the message from any other record, including the previously received record 314.

Following processing of a selector interrupt, the method embodiment of FIG. 1 returns to steps of receiving incoming calls (blocks 32, 34). As will be appreciated in consideration of FIG. 1, this embodiment of the method of the invention generally comprises receiving a plurality of calls, with records created for each individual call and displayed as they occur. There is no practical limit for the number of calls that may be received within the system and method of the invention save for memory capacity for storing records. Those knowledgeable in the art will appreciate that memory resources required for the data in each record is low, and that memory resources are generally available as low cost commodity components. With these considerations in mind, record storage capacity of the method and system embodiments is very high.

Those knowledgeable in the art will also appreciate that the present invention will find utility when practiced in the form of a computer program product. Accordingly, additional embodiments of the invention comprise computer program products for causing processor based systems to take certain actions. In particular, a computer program product of the invention comprises computer executable instructions embedded in a computer readable medium for execution by a computer to cause the computer to perform various actions. The term "computer" as used herein is intended to broadly refer to processor based devices, and may comprise, by way of example, the system for managing call data as illustrated in FIG. 2.

Computer readable mediums for storing the program product instructions may comprise any of a wide variety of mediums that are generally known in the art. Examples include, but are not limited to optical media such as disks and the like, magnetic media such as disks and the like, circuitry, embedded circuitry, and the like. By way of example, computer program product embodiment instructions may be stored in a memory that is contained within the recorder 116 of the system embodiment 108 of FIG. 2, within the processor 114, and/or within the display 118. The computer readable instructions may comprise computer code written in a language such as C++, Java, or the like that is compiled into a machine-readable format.

It will be also be understood that computer program product embodiments of the invention generally comprise processor executable instructions that when executed cause a system to perform a method of the invention. By way of example, a program product of the invention may be executed by the processor 114 to cause the system 108 of FIG. 2 to perform the steps of a method embodiment of the invention as illustrated in the flowchart of FIG. 1. Accordingly, it will be appreciated that the invention embodiment illustrated in FIG. 1 and discussed herein is intended to illustrate a computer program product of the invention as well as a method embodiment.

It will also be appreciated that the system, method, and program product embodiments as illustrated in the attached Figures and as discussed herein are not limited to particular elements or sequences as described. Indeed, those knowledgeable in the art will appreciate that changes may be made to the embodiments without escaping the scope or spirit of the invention. By way of example, it will be appreciated that the method and program product embodiment as illustrated in FIG. 1 could easily be altered in sequence without changing the scope of the invention. Further, those knowledgeable in the art will realize that there are a variety of particular steps and that may be substituted for those illustrated and that wile different than those shown are functionally equivalent and thereby are within the scope of the present invention.

Also, it will be appreciated that a system embodiment of the invention may comprise a recorder for recording messages remote from the display and/or processor. A system embodiment of the invention, for instance, may use a voice mail system that records messages with a centralized recorder that is remote from the phone 106. Additionally, embodiments of the invention may comprise processors and/or program instructions that are remote from the phone 106. A processor, recorder, and/or program instructions may for instance be connected to the PSTN 104, with only a display located with the phone 106. Further, a system embodiment of the invention may comprise a display, recorder, and/or processor that is provided integrally with a phone set. A computer connected to a phone line used to execute a program product of the invention would of course likewise comprise a system of the invention.

The present invention thereby solves many of the otherwise unresolved problems in the art in an elegant and novel manner. For example, a display conveniently shows a log of received calls, with an indication of who called, what time a call was received, and whether or not a message was left. Additionally, any received call may be selected from the display using a selector for replay of a message, regardless of the sequence of call reception or display.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A computer program product for causing a communications information management system to manage communications data, the program product comprising a computer usable medium having computer readable program code embodied in the medium that when executed by a processor causes the management system to:

receive a plurality of incoming phone calls directly from the public switched telephone network, at least one of said plurality of incoming phone calls including video communications data;

determine communications origination identity data for each of said plurality of phone calls using a processor;

record a video message from said video communications data included with said at least one of said plurality of phone calls with a recorder locally connected to said processor;

determine a time of occurrence and a duration time for each of said phone calls using said processor;

create a communications record for each of said plurality of communications using said processor, said record comprising said identity data for each of said plurality of phone calls, a time of occurrence for said phone calls, a duration time for said phone calls and an indication of the existence of a recorded message for said record;

display a plurality of said records on a visual display locally connected to said recorder and said processor, said visual display having a selector for selecting a particular record from any of said records regardless of record sequence;

generate a selection interrupt upon selection of one of said plurality of records; and, respond to said selection interrupt corresponding to selection of said record corresponding to said at least one of said plurality of incoming calls by playing said recorded video message.

2. A method for managing communications as defined by claim 1 wherein the computer program instructions when causing the computer to generate a selection interrupt causes the computer to respond to a voice activation command.

3. A method for managing communications information comprising the steps of:

receiving a plurality of incoming phone calls directly from the public switched telephone network;

determining phone call origination identity for each of said plurality of phone calls using a processor;

recording a message for at least one of said plurality of incoming phone calls with a recorder locally connected to said processor;

creating a communications record for each of said plurality of phone calls using said processor, each of said records comprising said phone call origination identity for one of said plurality of phone calls and an indication of the existence of a recorded message for said one phone call;

displaying a plurality of said records on a display, said display having a selector for selecting any of said records, said display locally connected to said recorder, use of said selector causing a selection interrupt to be generated;

receiving said selection interrupt and querying said interrupt to determine if it is a selection interrupt; and, playing said recorded message corresponding to a selected record from said recorder in response to said selection interrupt.

4. A method for managing communications information according to claim 3 wherein said method further comprises determining a time of occurrence and a duration time of each of said plurality of phone calls and wherein said records further comprise said time of occurrence and said duration time.

5. A method for managing communications information according to claim 3 wherein said step of displaying said records on said display comprises displaying each of said records as a row across said display, and dividing each record into a plurality of fields arranged in columns.

6. A method for managing communications information according to claim 5 wherein one of said plurality of columns comprises an origination identity field, one of said columns comprises a time of communications field, and one of said columns comprises a recorded message indicator field.

7. A method for managing communications as defined by claim 3 wherein said selector comprises a means for receiving a voice activation command, and wherein the step of receiving said selection interrupt comprises receiving a voice activation command.

8. A method for managing communications information comprising the steps of:

receiving a plurality of incoming phone calls directly from the public switched telephone network, at least one of said plurality of incoming phone calls including video data;

determining phone call origination identity for each of said plurality of phone calls using a processor;

recording a video message from said at least one of said plurality of incoming phone calls with a recorder locally connected to said processor, said video message including said video data from said at least one of said plurality of incoming phone calls;

creating a communications record for each of said plurality of phone calls using said processor, each of said records comprising said phone call origination identity for one of said plurality of phone calls and an indication of the existence of a recorded message for said one phone call;

displaying a plurality of said records on a display, said display having a selector for selecting any of said records, said display locally connected to said recorder; and, responding to selection of said record corresponding to said at least one of said plurality of incoming phone calls by playing said recorded video message.

9. A method for managing communications information according to claim 8 wherein said method further comprises determining a time of occurrence and a duration time of each of said plurality of phone calls and wherein said records further comprise said time of occurrence and said duration time.

10. A method for managing communications information according to claim 8 wherein said step of displaying said records on said display comprises displaying each of said records as a row across said display, and dividing each record into a plurality of fields arranged in columns.

11. A method for managing communications information according to claim 10 wherein one of said plurality of columns comprises an origination identity field, one of said columns comprises a time of communications field, and one of said columns comprises a recorded message indicator field.

* * * * *